United States Patent
Berquist et al.

(10) Patent No.: US 7,161,470 B2
(45) Date of Patent: *Jan. 9, 2007

(54) USER INTERFACE FOR PORTABLE RFID READER

(75) Inventors: David T. Berquist, St. Paul, MN (US); Peter M. Eisenberg, Minneapolis, MN (US); Mitchell B. Grunes, Minneapolis, MN (US); Robert J. Schilling, Arden Hills, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 308 days.

This patent is subject to a terminal disclaimer.

(21) Appl. No.: 09/755,714

(22) Filed: Jan. 5, 2001

(65) Prior Publication Data

US 2001/0008390 A1    Jul. 19, 2001

Related U.S. Application Data

(63) Continuation-in-part of application No. 09/484,370, filed on Jan. 14, 2000, now abandoned.

(51) Int. Cl.
*H04Q 5/22* (2006.01)
(52) U.S. Cl. .............. 340/10.31; 340/10.5; 340/825.49
(58) Field of Classification Search ............. 340/10.31, 340/10.51, 10.1, 10.52, 572.1, 323 R, 321, 340/571, 825.49, 10.32; 235/385, 375, 376, 235/472.01, 472.02, 462.46, 462.47, 454, 235/492, 493, 380, 381, 383; 700/9; 705/23
See application file for complete search history.

(56) References Cited

U.S. PATENT DOCUMENTS

| | | | | |
|---|---|---|---|---|
| 3,893,099 | A | * 7/1975 | Zoepfl | 340/323 R |
| 4,636,950 | A | 1/1987 | Caswell et al. | 364/403 |
| 4,688,026 | A | 8/1987 | Scribner et al. | 340/572 |
| 4,827,395 | A | * 5/1989 | Anders et al. | 700/9 |
| 4,835,372 | A | 5/1989 | Gombrich et al. | 235/375 |
| 4,837,568 | A | 6/1989 | Snaper | 340/825 |
| 4,850,009 | A | 7/1989 | Zook et al. | 379/96 |
| 5,008,661 | A | 4/1991 | Raj | 340/825 |
| 5,151,684 | A | 9/1992 | Johnsen | 340/572 |
| 5,253,162 | A | 10/1993 | Hassett | |
| 5,280,159 | A | 1/1994 | Schultz et al. | 231/382 |
| 5,288,980 | A | 2/1994 | Patel et al. | 235/381 |
| 5,294,781 | A | * 3/1994 | Takahashi et al. | 235/376 |
| 5,360,967 | A | 11/1994 | Perkin et al. | 235/375 |
| 5,539,193 | A | * 7/1996 | Gibbs et al. | 235/472.02 |
| 5,573,611 | A | 11/1996 | Koch et al. | |
| 5,610,596 | A | 3/1997 | Petitclerc | 340/825 |
| 5,640,002 | A | 6/1997 | Ruppert et al. | 235/472 |
| 5,668,803 | A | 9/1997 | Tymes et al. | 370/312 |
| 5,689,238 | A | * 11/1997 | Cannon et al. | 340/572.1 |
| 5,708,423 | A | 1/1998 | Ghaffari et al. | |
| 5,729,697 | A | * 3/1998 | Schkolnick et al. | 705/23 |
| 5,751,221 | A | 5/1998 | Stanfield et al. | 340/825 |

(Continued)

FOREIGN PATENT DOCUMENTS

AU    2003244560 A1    10/2003

(Continued)

*Primary Examiner*—Wendy R. Garber
*Assistant Examiner*—William Bangachon
(74) *Attorney, Agent, or Firm*—Melissa E. Buss

(57) ABSTRACT

A user interface for a radio frequency identification interrogation system is disclosed, which interface may include graphics, sounds, lights, or combinations of the foregoing that provide information to a user in regard to the materials being interrogated.

27 Claims, 3 Drawing Sheets

U.S. PATENT DOCUMENTS

| | | |
|---|---|---|
| 5,751,257 A | 5/1998 | Sutherland ............... 345/2 |
| 5,769,051 A | 6/1998 | Bayron et al. |
| 5,786,764 A | 7/1998 | Engellenner ............ 340/572 |
| 5,804,810 A | 9/1998 | Woolley et al. .......... 235/492 |
| 5,808,558 A | 9/1998 | Meck et al. ............. 340/870 |
| 5,821,513 A | 10/1998 | O'Hagan et al. ........ 235/383 |
| 5,822,714 A | 10/1998 | Cato ..................... 702/108 |
| 5,850,187 A | 12/1998 | Carrender et al. ........ 340/825 |
| 5,963,134 A * | 10/1999 | Bowers et al. .......... 340/572.1 |
| 6,032,127 A | 2/2000 | Schkolnick et al. ........ 705/23 |
| 6,056,199 A | 5/2000 | Wiklof et al. ........... 235/462 |
| 6,057,756 A | 5/2000 | Engellenner ............ 340/505 |
| 6,078,251 A | 6/2000 | Landt et al. ............. 340/10 |
| 6,084,528 A | 7/2000 | Beach et al. ............ 340/825 |
| 6,150,921 A | 11/2000 | Werb et al. ............. 340/10 |
| 6,182,053 B1 | 1/2001 | Rauber et al. ........... 705/28 |
| 6,218,942 B1 | 4/2001 | Vega et al. ............. 340/572 |
| 6,232,870 B1 | 5/2001 | Garber et al. ............ 340/10 |
| 6,244,512 B1 | 6/2001 | Koenck et al. .......... 235/472 |
| 6,261,247 B1 * | 7/2001 | Ishikawa et al. ......... 600/587 |
| 6,318,636 B1 * | 11/2001 | Reynolds et al. ...... 235/472.01 |
| 6,362,738 B1 | 3/2002 | Vega |
| 6,600,418 B1 * | 7/2003 | Francis et al. .......... 340/572.1 |
| 6,614,721 B1 * | 9/2003 | Bokhour ................. 367/128 |

FOREIGN PATENT DOCUMENTS

| | | |
|---|---|---|
| CN | 1293732 A | 5/2001 |
| CN | 1315027 | 9/2001 |
| DE | 196 52 092 A1 | 6/1998 |
| EP | 0 450 212 A1 | 10/1991 |
| EP | 0 794 507 A2 | 9/1997 |
| EP | 0 818 690 | 1/1998 |
| GB | 2 204 162 A | 11/1988 |
| GB | 2 308 947 | 7/1997 |
| JP | 8-108911 | 4/1996 |
| WO | WO 96/41296 | 12/1996 |
| WO | WO 99/05660 | 2/1999 |
| WO | WO 00/10112 | 2/2000 |
| WO | WO 00/10122 | 2/2000 |
| WO | WO 00/10144 | 2/2000 |
| WO | WO 01/26048 | 4/2001 |

* cited by examiner

USER INTERFACE FOR PORTABLE RFID READER

RELATED APPLICATION

This patent application is a continuation-in-part of U.S. application Ser. No. 09/484,370, filed Jan. 14, 2000 now abandoned.

TECHNICAL FIELD

A user interface is described for use in and with a portable interrogation system. The portable interrogation system can be a radio frequency identification (RFID) interrogation system including a handheld reader.

BACKGROUND OF THE INVENTION

RFID interrogation systems have been proposed to detect the presence of an RFID tag associated with an article of interest. An example of such a system is disclosed in Patent Cooperation Treaty (PCT) Publication WO 99/05660, which is assigned to Checkpoint Systems Inc. That publication describes the use of an RFID inventory system in which the materials in a library can be checked in and out by detecting the RFID tags associated with those materials. The publication further describes periodically scanning the shelves of the library with an RFID scanner for updating the inventory status of the materials.

SUMMARY OF THE INVENTION

The present invention relates to improvements in portable RFID readers, and in particular to improvements in the user interface associated with such a reader. The user interface may include one or more of a number of features that provide information to a user, including the graphical representation of items (including the representation of a location of or for one item relative to an area of interrogation), the use of sound, and the use of light. These and other features of the inventive user interface are provided below.

BRIEF DESCRIPTION OF THE DRAWINGS

Various embodiments of the invention will be described below in reference to the attached Figures, in which.

DETAILED DESCRIPTION OF THE INVENTION

The invention relates in particular to an improved user interface for a portable RFID interrogation (or reader) system. Accordingly, the contents of allowed copending U.S. application Ser. No. 09/368,826, filed Aug. 5, 1999, is incorporated herein by reference. That application describes a number of uses and configurations for such a portable RFID reader.

A. The Portable RFID Reader

Figure 1:
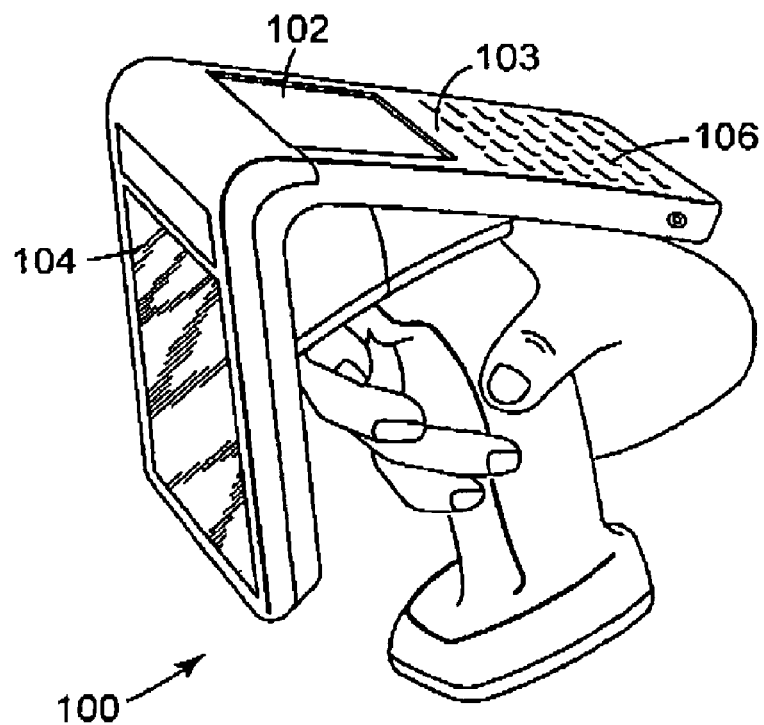
FIG. 1 is a perspective view of a portable RFID reader.
Figure 2:
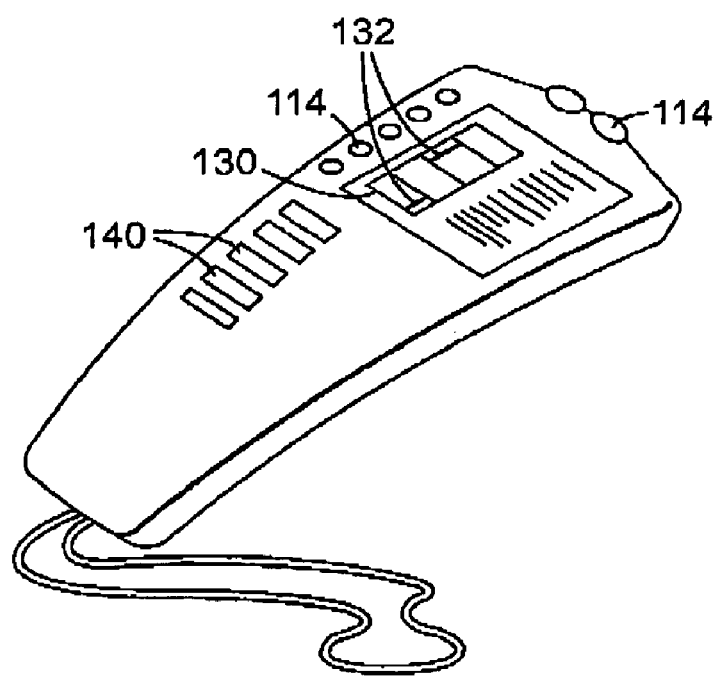
FIG. 2 is a second embodiment of a portable RFID reader.
Figure 3:
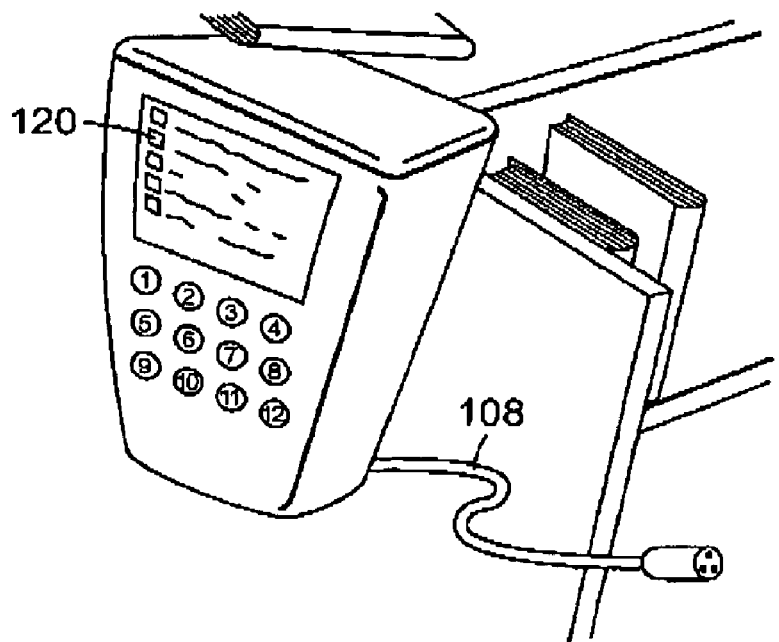
FIG. 3 is a third embodiment of a portable RFID reader.

The portable RFID reader is preferably a handheld reader of the type shown in FIG. 1 at 100, and may include a display 102, a power source, a database, a processor 103, an antenna 104, and other components such as a keypad 106, infrared receiver and/or transmitter, function key(s) (as shown in FIG. 2 at 140), or other method of providing information to the reader. Alternatively, some of those components may not be included, or may be tethered to a handheld reader. For example, the power source may be connected to the RFID reader by a power cord as shown in FIG. 3 at 108, which can reduce the weight of the RFID reader itself. Reference number 108 could also represent or include a data transmission line used by the RFID reader to transmit and/or receive information. Other portable RFID readers are shown in FIGS. 2, 3, 5 and 6. The functions of each of the components of the portable RFID reader is evident, but the following overview is provided as background information.

The display may be selected from among suitable displays, and may be a screen that can be activated by the touch of a user's finger, or with a stylus, or both. The display may be part of a handheld computer, or personal digital assistant, of the type available from Palm Computing of Santa Clara, Calif., under the designation "Palm V," for example, or may be separate from the processor. The power source should be sufficient to power the unit (including the display, the processor, and any sound or light generation source of the type described below), preferably without adding so much weight as to make the unit cumbersome. The power source could be a battery, and preferably a rechargeable battery, and can as described above be integral with the RFID reader or connected via a power cord to, for example, a power source that can be worn around a users waist. The RFID reader could even be powered by standard alternating current, although the cord might interfere with the user's mobility.

The database and processor may be selected to support the functions to be achieved by the RFID reader. The selection of a suitable processor is well within the ambit of one of ordinary skill, and the database may be configured to match the identification code of the RFID tag that has been interrogated to the identity of the material of interest, or to a class of materials to which the material belongs, or to a list of one or more specific materials in which the user is interested, for example. The database can also provide less than all of the information that may be desired by a user, with the additional information being available on a separate database to which the portable RFID reader can be connected. For example, the RFID reader can be docked with a docking station, or linked by infrared or a cable line to another database, which can provide additional information to the RFID reader about one or more of the interrogated items.

The antenna is preferably a loop antenna, but may be selected from among any suitable antennae that facilitate the transfer of information between the RFID tag and the RFID reader. The antenna (either the same or a different antenna) can also be used to transfer information to the RFID tag in applications where the system is capable of both reading from and writing to the tag. The form factor of the antenna and the materials from which it is constructed may be selected by a person of ordinary skill in the art.

B. The User Interface

Figure 4:
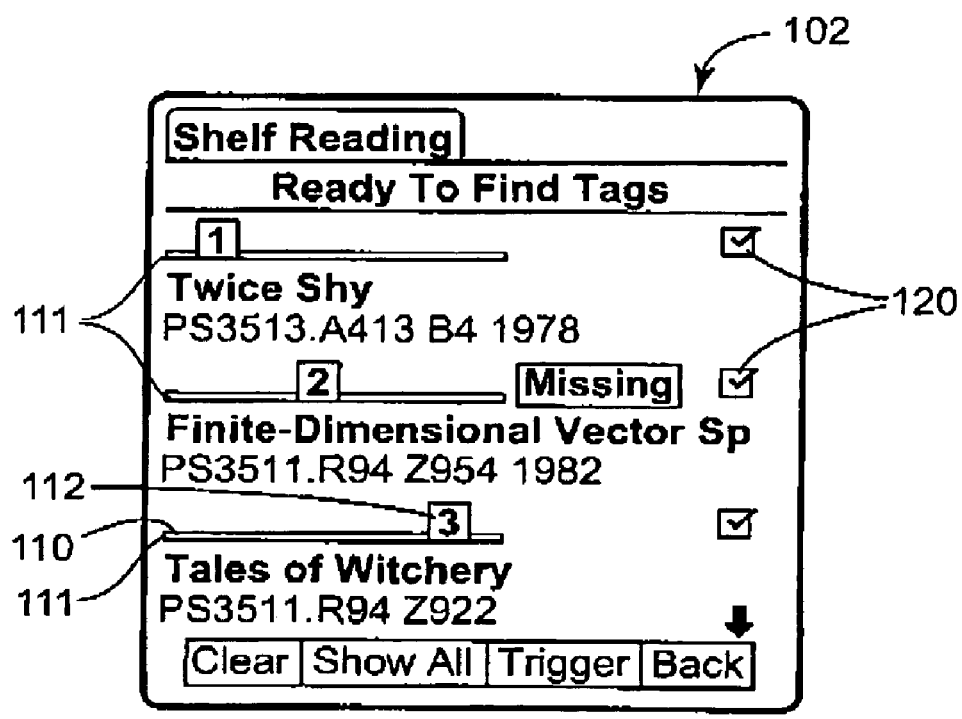
FIG. 4 is an exemplary display showing a user interface having at least one graphical component.

If the portable interrogation system is being used in, for example, a library to scan RFID tags associated with the library materials, as shown in FIG. 4, then certain operations may be common. For example, the RFID reader may be used to scan the materials on a single shelf, and to identify whether a given material is inappropriately located on that shelf, or whether a material that is expected to be on that shelf is not. The RFID reader may also provide an indication of where a specified material should be located on a shelf. The present invention relates to various aspects of a user interface that enables the portable RFID reader to communicate information of interest to a user through graphical or textual information provided by the display, through audio signals, through lights or other visual signals, or through a combination of the foregoing. As used in connection with the present invention, the term "graphics" and its variants mean a visual depiction of information composed primarily of non-characters.

The display portion of the user interface for the RFID reader can include, for operations related to scanning the materials in a given area, a first (preferably graphical) component that illustrates the area or its boundaries, and a second (preferably graphical) component that illustrates a location within tat area, such as where within that area a specified material is located, or should be located. Either or bet of the components of the user interface may include characters (such as a letter or symbol (a "*", for example)) or graphics (such as a bar, a box, or a picture of a book), for example, or an illuminated or darkened portion of the display, or a flashing area, or the like. For example, if the scanned area is a single book shelf, the first component of the user interface may be a longitudinal bar graphic such as that shown in FIG. 4 at 110, representing the interrogation area 111, and the second component may be a highlighted portion of the bar as shown at 112. If the scanned area consists of multiple book shelves, as shown in FIG. 2, then the first component of the user interface may be a graphical representation of multiple book shelves as shown at 130, and the second component may be a highlighted portion 132 of that graphic. The first component of the user interface could alternatively be a series of numbered or otherwise designated icons, and the second component could be a variation in the display of one of the icons of interest that distinguishes it from the rest of the icons. Various combinations of the foregoing are also possible.

In another embodiment, the user interface may provide an indication of how far away the reader is from the item of interest, or an intended location for an item of interest, in terms of the number of items, shelves, feet, or other measurable unit that separate the item currently being interrogated from the item or location of interest. That is, if the items are books, and the RFID reader determines that the book currently being interrogated is approximately 100 books to the left of the book of interest, the user interface could provide an indication (graphically, numerically, alphanumerically, audibly, and/or otherwise) that the user is approximately 100 books to the left of the desired location. The exact distance that the current item is away from the intended item or location may be difficult to measure in terms of the number of items if the intermediate items between the two can be removed or checked out, but this difficulty could be overcome if the RFID reader includes or can obtain from a database information sufficient to determine how many of the intermediate items are expected to be present.

In addition to graphical information, it is also desirable in some instances to provide sounds or lights or both to provide information to a user. The interface can be programmed to provide sound(s) when the RFID reader passes a tagged item, or only when the RFID reader passes an item that is within a predetermined class of items (such as, in the case of a library, lost books, or books that were not checked in through library staff or equipment, or books that are supposed to have been held for a patron) or more than one class of items. This can be referred to as "exception checking," in that the user is checking a group of items for exceptions. Another use of sound to provide information to a user may be for "pacing," in which sounds are provided at a specified rate to provide an indication to the user of the approximate rate at which the RFID reader should be passing the materials. Pacing is useful because it optimizes productivity, because slower workers can be trained to speed up, and faster workers (who may move the RFID reader faster than information can be reliably obtained from an RFID tag) can be trained to slow down.

Sounds can be provided in any desirable fashion. It may be particularly useful to provide different sounds in connection with different operations, so that trained users become accustomed to hearing a given sound when performing a corresponding operation. The frequency, duration, and number of repetitions of a sound may be varied to provide sounds that a user interprets as being favorable or positive (such as short, higher frequency sounds, perhaps repeated three times, for example) or unfavorable or negative (such as longer, lower frequency sounds). By way of a specific example, a favorable sound may be one having a frequency of 1000 Hz and a duration of 35 milliseconds that is repeated three times, and an unfavorable sound may be one having a frequency of 300 Hz and a duration of 120 milliseconds that is played only once. Innumerable variations are possible.

One or more lights may be used either together with or independently of sounds and graphics to provide information to a user. In addition to using lights to provide information such as that described above in regard to sounds, a series of lights may be lit sequentially as the RFID reader approaches an item or location of interest. That is, when an RFID reader is approaching an item or location of interest from the left, the left-most light (to indicate that the reader is to the left of the item or location of interest) or the right-most light (to indicate that the reader must be moved to the right to reach the item or location of interest) could light first, followed by the next adjacent light (the light to the its right or the light to its left, respectively) and so on, until the center light of a series of lights is (or all lights are) lit, indicating that the item or location of interest is in approximately the center of the readable field. This arrangement is currently used in some types of "stud-finders," which locate metal (typically nails) within walls so that a user can determine the location of a wall stud. Lights may be provided as an integral part of the display, or may be provided elsewhere on the RFID reader as shown in FIG. 2 at 114.

In another aspect, the user interface may permit a user to highlight one or more items from among a list of items, as shown by the checked boxes 120 in FIGS. 3 and 4. When the RFID reader includes a display that can be activated by touch (such as the display of a Palm computer, referenced above), the user can highlight the component(s) (textual, graphical, or other) on the display that identify a material of interest. The RFID reader can then be passed over a group of materials and a signal (e.g. graphical, sound, and/or light) provided indicating when the material of interest has been interrogated.

The user interface of the RFID reader of the present invention may be programmed to provide a signal when the RFID tag associated with an interrogated item that meets a certain criterion. The criterion could be the specific RFID tag associated with a particular item of interest, or any RFID tag that is out of order relative to the RFID tag of at least one adjacent item, or a class of items to which the item of interest belongs. In the case of a library, the RFID reader could provide a signal when the RFID tag associated with a specific book is interrogated, or when adjacent library materials are misshelved, or when the RFID tag associated with a book that is of a particular type (fiction, or reference, for example) is interrogated. The criterion or criteria of interest may be selected from among criteria shown on the display by the user interface, for example by a user touching the display to designate a specific criterion. For example, in the user interface shown on a sample display in FIG. 4, a series of boxes 120 are provided, which may be checked or unchecked to specify the item to which it corresponds.

It may also be desirable to provide an indication to the user through the user interface of a relative location of an item, rather than an absolute location of that item. That is, a user may decide that if two items are next to each other, even if they are transposed in relation to a predetermined or expected order of items, they are nonetheless close enough to enable a subsequent patron or user to locate even if the items are not in their strict prescribed order. This "fuzzy logic" location function may also be desirable if the resolution of the reader cannot reliably permit the RFID reader to determine whether one item is to the left or the right of another item, for example. Thus, the RFID reader (and/or certain software and the associated processor) of another embodiment of the present invention may be programmed to equate detected items that are near, next to, or close to each other with the same items stored in the memory of the reader in rank order. For example, an item that is separated by from two to five items from its predetermined location in the order may be treated as though it is in the predetermined location in that order.

In another aspect, the user interface can provide an indication when the user is attempting to interrogate RFID tags, but no information is being obtained. The indication could be textual, graphical, aural, or visual, as described above. The user can then take steps to correct the problem, which may result from passing the RFID reader over materials that have no RFID tags, or from passing over tagged items too quickly or at too great a distance to obtain a response, or from a failure to activate some part of the RFID reader, or from low battery or other power, or from some other failure. The sequence of steps necessary to perform this function may be, for example, (a) a command is sent to the interrogation source instructing it to interrogate any RFID tags that it can; (b) the interrogator awaits a response; and (c) if no RFID tags respond (within a specified time, for example), then the user interface provides a signal (graphical, textual, audio, or visual, or a combination) to the user denoting that condition.

In another aspect of the present invention, the user can specify which information the user wishes to have displayed regarding a particular item interrogated by the RFID reader or process performed by the reader. That is, the user may wish for interrogated items to be displayed with the name or title of the item on the first line of the display, a serial or call number on the second line, the desired location for the item on the third line, and so one. Regarding processes, the user interface could be adapted to display an indication of the range of items interrogated, the percentage of items expected to have been interrogated that were not detected, an indication of the relative degree of orderliness to the interrogated items, and the like.

The type of programming necessary to effectuate the features of the inventive user interface will vary depending on the kind of computer used to control tat interface. In the context of a palmtop computer such as the Palm computer referenced earlier, the programming may be done as follows. The most common language used to program the Palm computer is the C language. The most common tools used to program the Palm computer are Metrowerks Codewarrior (editor, compiler, linker), Metrowerks Constructor (for designing graphical displays) and the Palm OS Emulator (for running Palm OS applications on a PC or Mac). Further information about Metrowerks products, which are available from Metrowerks, Inc. of Austin, Tex., is available from Metrowerks.

Graphical objects, such as graphics, buttons and lists can be created with the Metrowerks Constructor tool by placing them onto a representation of the Palm computer display. These objects are then stored as resources in a file that Codewarrior uses to bind to the executable Palm computer application. When the application is run on the Palm computer, Palm OS routines automatically load the objects from the resources and display them on the display.

Sounds can be played using the sound routines in the Palm API. There are multiple ways to play sounds, including playing a tone by specifying its frequency and duration. If more flexibility is needed than what is provided by the Palm OS, sound commands may be sent over the serial port of Palm computer to a custom device to play sounds. Lights may be implemented by sending custom commands over a serial port to a custom device to turn lights on and off.

Data can be entered into the Palm computer in multiple ways. When a Palm is connected to a personal computer by a serial port, programs on the personal computer can transfer data and applications between the personal computer and the Palm computer. This is commonly referred to as a "Hotsynch" operation. Applications that run on the Palm computer can store data in databases which are in the Palm computer's memory. Data can be entered by the user using multiple methods, including using the stylus to select characters from a displayed keyboard, by drawing special graffiti language characters on a specified portion of the display, or by infrared transmission.

Similarly programming tools and applications are available for other programming platforms, such as Windows CE-based devices.

Figure 5:
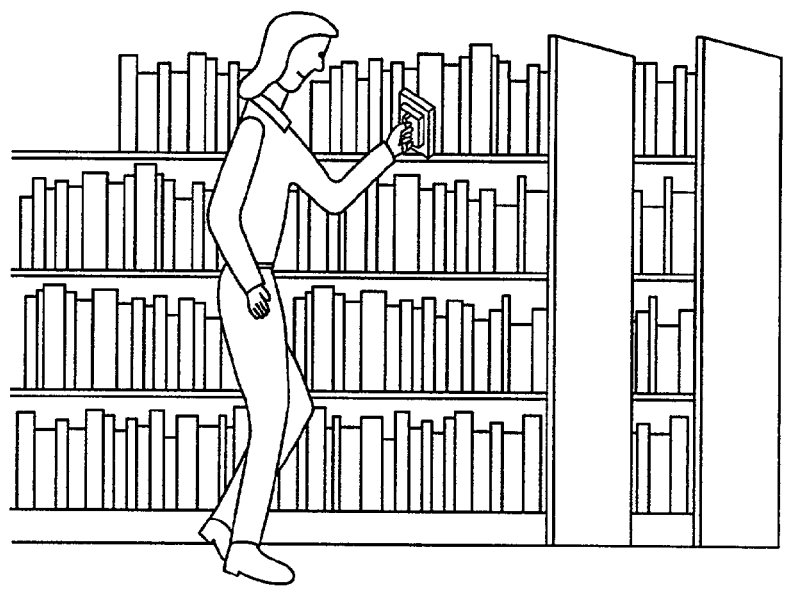
FIG. 5 illustrates a user interrogating library materials with a portable RFID reader.
Figure 6:
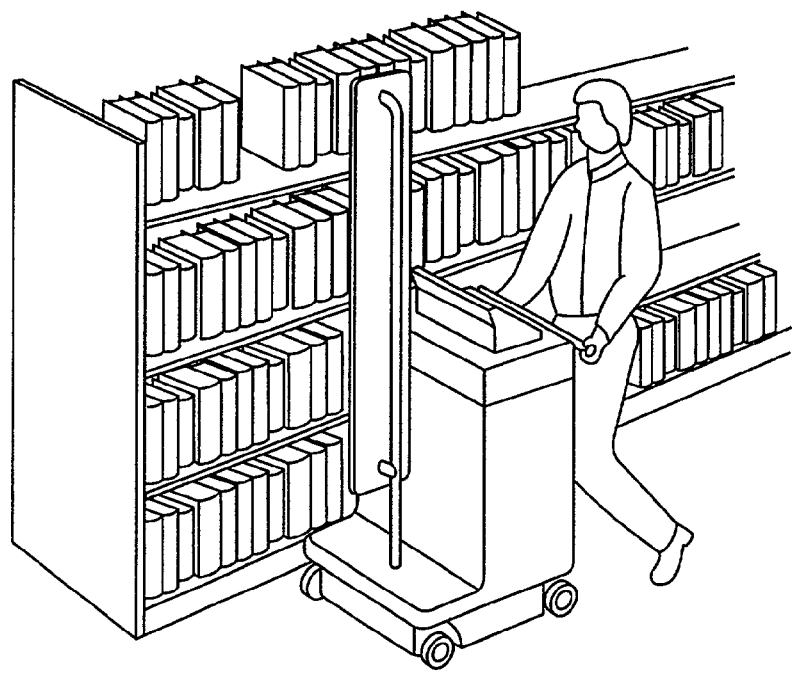
FIG. 6 illustrates a user interrogating library materials with another embodiment of a portable RFID reader.

The portable RFID readers having user interfaces of the types described herein may be used as shown in FIGS. 5 and 6, for example. A user can move the portable reader along one or more collections of materials, and obtain information from the portable reader in the manner described herein. In addition to using an RFID tag to identify an item, RFID tags may be used to identify predetermined locations, so that location information may be provided to a user through any of the methods described herein.

Although the invention has been described with reference to certain specific embodiments of the present invention, many variations of those embodiments are possible. For example, a number of embodiments of the present invention are set forth in terms of a particular structure (such as an RFID reader) for carrying out a process or method, but the method of using that particular structure is also within the scope of the present invention. That is, the described uses for a particular structure are another manner of describing a method of using that structure for that use. Accordingly, the scope of the invention is set forth with reference to the appended claims.

We claim:

1. A portable RFID reader for use in interrogating RFID tags associated with items, comprising:
   (a) an RFID interrogation source that interrogates a plurality of items located within an interrogation area, wherein the plurality of items includes at least one item of interest;
   (b) an antenna;
   (c) a processor that determines a location of the item of interest within the interrogation area based on the interrogated plurality of items;
   (d) a display; and
   (e) a user interface in which a representation of the interrogation area is shown on the display as a first graphical component of the user interface, and a representation of the item of interest is shown on the display as a second graphical component of the user interface relative to the first graphical component to indicate the location of the item of interest within the interrogation area,
   wherein the RFID interrogation source is coupled to the processor, the antenna is coupled to either the RFID interrogation source or the processor, and the processor is coupled to the display.

2. The portable RFID reader of claim 1, wherein the processor and display are components of a hand-held computer.

3. The portable RFID reader of claim 1, wherein the display may be activated by touch.

4. The portable RFID reader of claim 1, wherein the user interface further includes text associated with the item of interest may be presented on the display for observation by a user.

5. The portable RFID reader of claim 1, wherein the user interface further includes at least one audio signal for providing information to the user.

6. The portable RFID reader of claim 5, wherein the audio signal is provided each time an RFID tag is interrogated.

7. The portable RFID reader of claim 5, wherein the audio signal is only provided when the RFID tag of an item meeting a predetermined criterion is interrogated.

8. The portable RFID reader of claim 1, wherein the user interface further includes at least one light for providing information to the user.

9. The portable RFID reader of claim 8, wherein at least one light is illuminated each time an RFID tag is interrogated.

10. The portable RFID reader of claim 8, wherein the light is only illuminated when the RFID tag of an item meeting a predetermined criterion is interrogated.

11. The portable RFID reader of claim 1, wherein the first graphical component is a group of icons, and the second graphical component is one of the icons of the series, in which the one icon is visually differentiated from the remainder of the icons.

12. A portable RFID reader for use in interrogating RFID tags associated with items of interest, comprising:
   (a) an RFID interrogation source that interrogates a plurality of items located within an interrogation area, wherein the plurality of items includes at least one item of interest;
   (b) an antenna;
   (c) a processor that determines a location of the item of interest within the interrogation area based on the interrogated plurality of items;
   (d) a display; and
   (e) a user interface in which a representation of the interrogation area is shown on the display as a first graphical component of the user interface, and the item of interest is shown on the display as a second graphical component of the user interface relative to the first graphical component to indicate the location within the interrogation area,
   wherein the RFID interrogation source is coupled to the processor, the antenna is coupled to either the RFID interrogation source or the processor, and the processor is coupled to the display,
   wherein the user interface further includes at least one audio signal for providing information to the user, wherein the audio signal is only provided when the RFID tag of an item meeting a predetermined criterion is interrogated, and wherein the predetermined criterion is selected from a group consisting of:
   (a) a specific RFID tag associated with an item of interest;
   (b) an RFID tag that is out of order relative to the RFID tag of at least one adjacent item; and
   (c) a class of items to which the item of interest belongs.

13. The portable RFID reader of claim 12, wherein the criterion in response to which the audio signal is provided may be presented on the display for observation by a user.

14. A portable RFID reader for use in interrogating RFID tags associated with items of interest comprising:
   (c) an RFID interrogation source that interrogates a plurality of items located within an interrogation area, wherein the plurality of items includes at least one item of interest;
   (d) an antenna;
   (c) a processor that determines a location of the item of interest within the interrogation area based on the interrogated plurality of items;
   (d) a display; and
   (e) a user interface in which a representation of the interrogation area is shown on the display as a first graphical component of the user interface, and the item of interest is shown on the display as a second graphical component of the user interface relative to the first graphical component to indicate the location within the interrogation area, wherein the RFID interrogation source is coupled to the processor, the antenna is coupled to either the RFID interrogation source or the processor, and the processor is coupled to the display, wherein the user interface further includes at least one light for providing information to the user, wherein the light is only illuminated when the RFID tag of an item meeting a predetermined criterion is interrogated, and wherein the predetermined criterion is selected from a group consisting of:
   (a) a specific RFID tag associated with an item of interest;
   (b) an RFID tag that is out of order relative to the RFID tag of at least one adjacent item; and
   (c) a class of items to which the item of interest belongs.

15. The portable RFID reader of claim 14, wherein the criterion in response to which the at least one light is illuminated may be presented on the display for observation by a user.

16. A portable RFID reader for use in interrogating RFID tags associated with items of interest, comprising:
   (e) an RFID interrogation source that interrogates a plurality of items located within an interrogation area, wherein the plurality of items includes at least one item of interest;
   (f) an antenna;
   (c) a processor that determines a location of the item of interest within the interrogation area based on the interrogated plurality of items;

(d) a display; and (e) a user interface in which a representation of the interrogation area is shown on the display as a first graphical component of the user interface, and the item of interest is shown on the display as a second graphical component of the user interface relative to the first graphical component to indicate the location within the interrogation area, wherein the first graphical component is a bar, and the second graphical component is a portion of the bar, and wherein the RFID interrogation source is coupled to the processor, the antenna is coupled to either the RFID interrogation source or the processor, and the processor is coupled to the display.

17. An RFID reader comprising:

(a) an RFID interrogation source that interrogates a plurality of items located within an interrogation area, wherein the plurality of items includes at least one item of interest;

(b) a processor that determines a location of the item of interest within the interrogation area based on the interrogated plurality of items;

(c) a display; and (d) a user interface in which a representation of the interrogation area is shown on the display as a first graphical component of the user interface, and a representation of the item of interest is shown on the display as a second graphical component of the user interface relative to the first graphical component to indicate the location of the item of interest within the interrogation area and which an audio signal is produced when the RFID reader interrogates an RFID tag associated with a predetermined location, wherein the RFID interrogation source is coupled to the processor and the processor is coupled to the display.

18. An RFID reader comprising:

(a) an RFID interrogation source that interrogates a plurality of items located within an interrogation area, wherein the plurality of items includes at least one item of interest;

(b) a processor that determines a location of the item of interest within the interrogation area based on the interrogated plurality of items;

(c) a display; and (d) a user interface in which a representation of the interrogation area is shown on the display as a first graphical component of the user interface, and a representation of the item of interest is shown on the display as a second graphical component of the user interface relative to the first graphical component to indicate the location of the item of interest within the interrogation area, and in which an audio signal is produced repeatedly at a desired interval to pace a user as to the speed at which RFID tags should be interrogated by the interrogation source, wherein the RFID interrogation source is coupled to the processor and the processor is coupled to the display.

19. An RFID reader comprising:

(a) an RFID interrogation source that interrogates a plurality of items located within an interrogation area, wherein the plurality of items includes at least one item of interest;

(b) a processor that determines a location of the item of interest within the interrogation area based on the interrogated plurality of items;

(c) a display; and (d) a user interface in which a representation of the interrogation area is shown on the display as a first graphical component of the user interface, and a representation of the item of interest is shown on the display as a second graphical component of the user interface relative to the first graphical component to indicate the location of the item of interest within the interrogation area and including at least one light that is illuminated when an RFID tag is interrogated, wherein the RFID interrogation source is coupled to the processor and the processor is coupled to the display.

20. The RFID reader of claim 19, wherein the light is illuminated only when an RFID tag associated with a specific material of interest is interrogated.

21. The RFID reader of claim 19, wherein at least one light remains illuminated while RFID tags are being interrogated, and at least one other light is illuminated only when an RFID tag associated with an item meeting a predetermined criterion is illuminated.

22. An RFID reader comprising:

(a) an RFID interrogation source that interrogates a plurality of items located within an interrogation area, wherein the plurality of items includes at least one item of interest;

(b) a processor that determines a location of the item of interest within the interrogation area based on the interrogated plurality of items;

(c) a display; and (d) a user interface in which a representation of the interrogation area is shown on the display as a first graphical component of the user interface, and the item of interest is shown on the display as a second graphical component of the user interface relative to the first graphical component to indicate the location within the interrogation area and including at least one light that is illuminated when an RFID tag is interrogated, wherein the user interface includes more than one light, and the lights are illuminated sequentially as the RFID reader approaches a desired location or material of interest, wherein the RFID interrogation source is coupled to the processor and the processor is coupled to the display.

23. An RFID reader comprising:

(a) an RFID interrogation source that interrogates an item;

(b) a processor that determines a number of intermediate items located between the interrogated items and an item or location of interest;

(c) a display; and (d) a user interface that displays an indication in a measurable unit of how far away the item or location of interest is from the interrogated item based on the determined number of intermediate items, wherein the RFID interrogation source is coupled to the processor and the processor is coupled to the display.

24. The RFID reader of claim 23, wherein the measurable unit is a number of items.

25. The RFID reader of claim 23, wherein the RFID reader accounts for missing intermediate items between the item or location of interest and the interrogated item when the indication is displayed by using the processor to reference a database to determine how many of the intermediate items are expected to be present.

26. The RFID reader of claim 25, wherein the database is located within the RFID reader.

27. The RFID reader of claim 25, wherein the database is located external to the RFID reader.

* * * * *

UNITED STATES PATENT AND TRADEMARK OFFICE
CERTIFICATE OF CORRECTION

PATENT NO. : 7,161,470 B2
APPLICATION NO. : 09/755714
DATED : January 9, 2007
INVENTOR(S) : David T. Berquist It is certified that error appears in the above-identified patent and that said Letters Patent is hereby corrected as shown below:

Column 2,
Line 34, delete "users" and insert -- user's --.

Column 3,
Line 21, delete "tat" and insert -- that --.
Line 23, delete "bet" and insert -- both --.

Column 6,
Line 1, delete "tat" and insert -- that --.

Column 8,
Line 24, after "interest" insert -- , --.
Line 25, delete "(c)" and insert -- (a) --.
Line 29, delete "(d)" and insert -- (b) --.
Line 60, delete "(e)" and insert -- (a) --.
Line 64, delete "(f)" and insert -- (b) --.

Column 10,
Line 44, delete "items" and insert -- item --.

Signed and Sealed this

Tenth Day of July, 2007

JON W. DUDAS
*Director of the United States Patent and Trademark Office*